Patented Dec. 30, 1924.

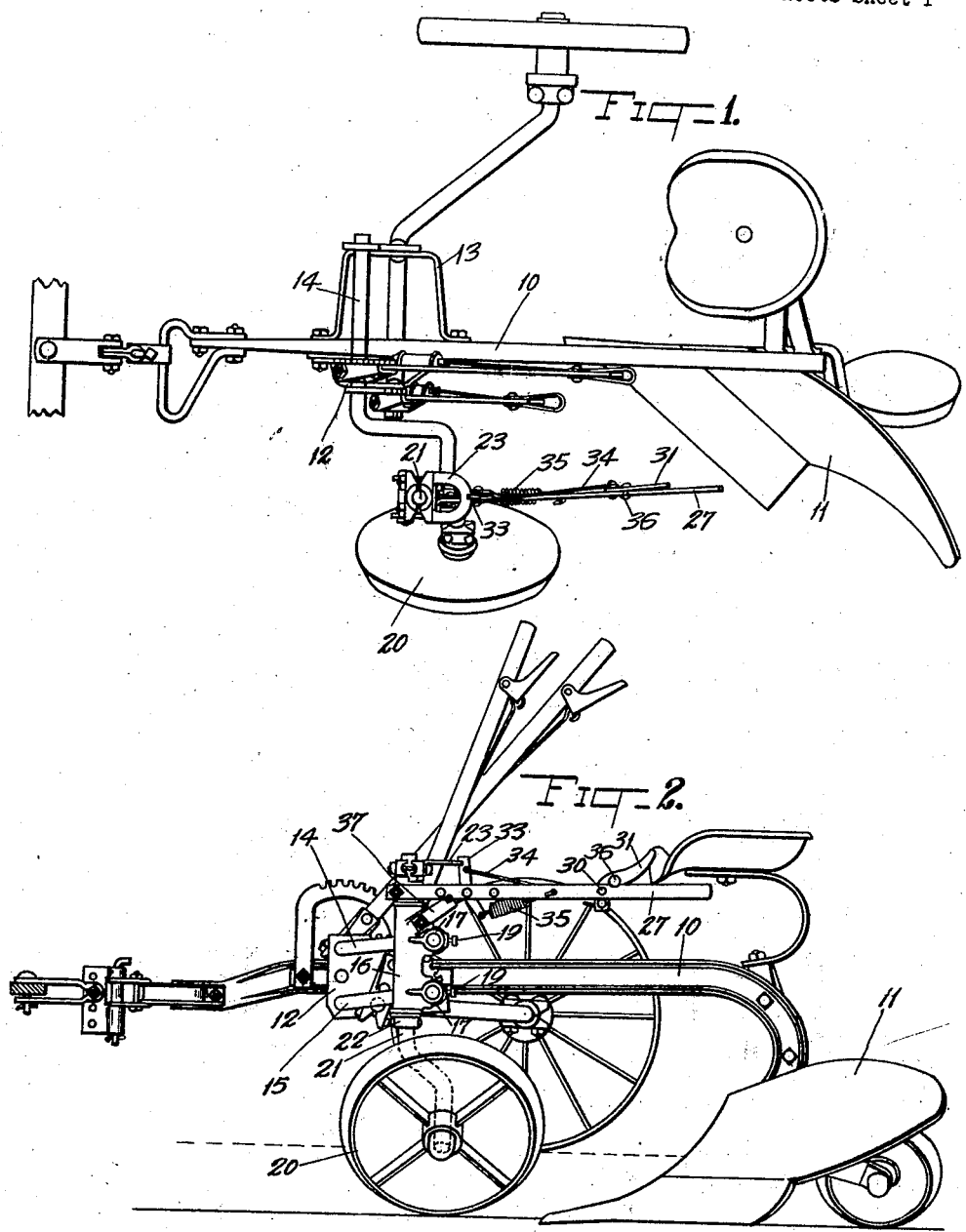

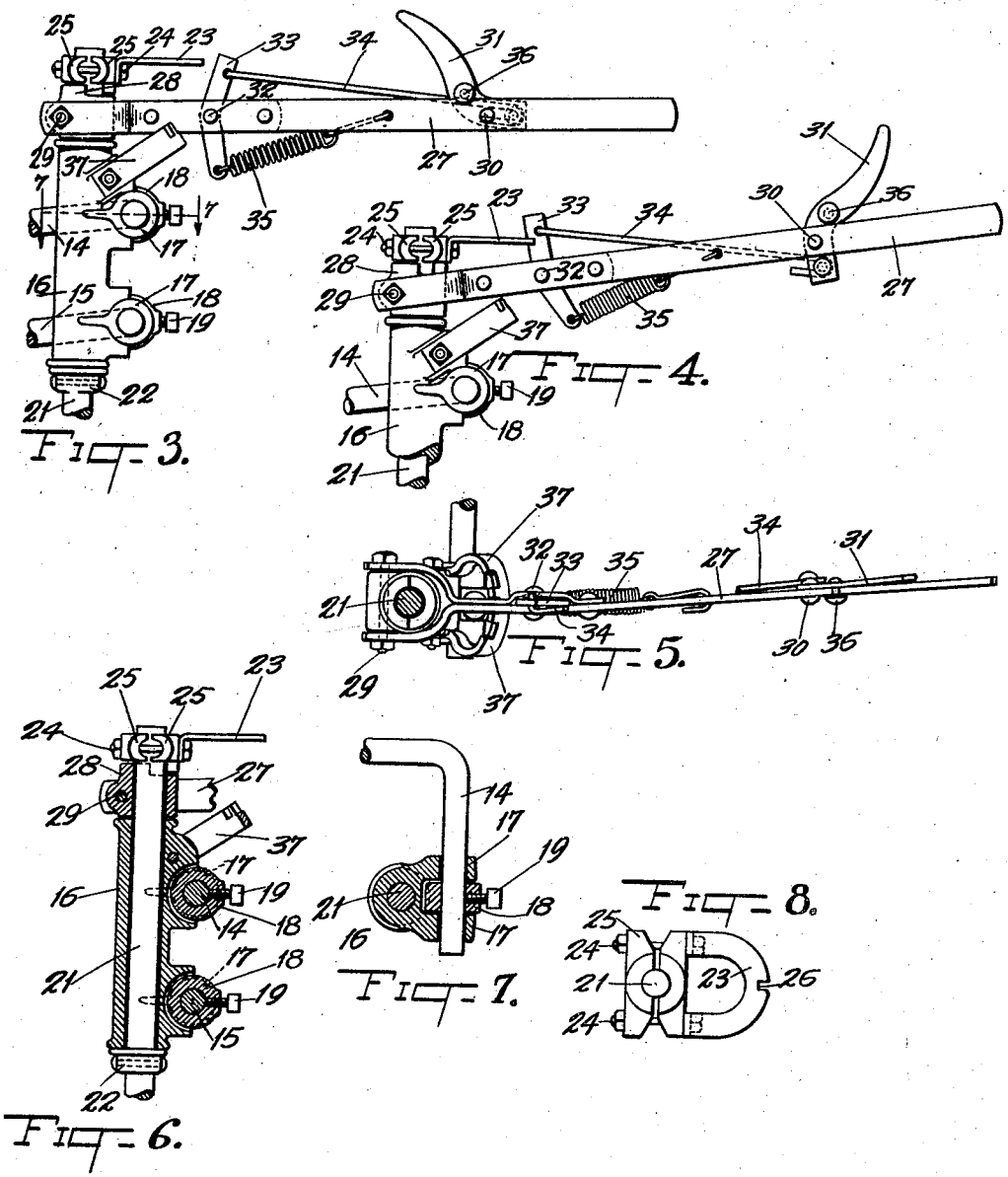

1,520,981

UNITED STATES PATENT OFFICE.

CARL G. STRANDLUND AND THEOPHILUS BROWN, OF MOLINE, ILLINOIS, ASSIGNORS TO DEERE & COMPANY, OF MOLINE, ILLINOIS, A CORPORATION OF ILLINOIS.

WHEELED PLOW.

Application filed November 30, 1923. Serial No. 677,715.

*To all whom it may concern:*

Be it known that we, CARL G. STRANDLUND and THEOPHILUS BROWN, citizens of the United States, and residents of Moline, in the county of Rock Island and State of Illinois, have invented certain new and useful Improvements in Wheeled Plows, of which the following is a specification, reference being had to the accompanying drawings.

This invention relates to an improvement in plows, and more particularly to means connected with the furrow wheel thereof and under the control of the operator from his seat whereby said furrow wheel can be locked in different operative positions so as to properly function during the plowing operation accordingly as the ground being plowed is level or inclined, as on a hillside, or can be released from a fixed relation to the plow frame and allowed to freely function as a caster wheel when the machine is turning a corner.

As heretofore constructed, machines having the furrow wheel adapted for the free movement of a caster wheel during a turning operation have had the controlling lever for such wheel rigidly connected to the standard of the furrow wheel and have had the sector that such lever engages with mounted on an element of the plow frame, and because of such construction and arrangement of the parts such lever would, during the time that the wheel was free to caster, partake of the lateral movements of the furrow wheel that resulted from such wheel passing over clods or other obstructions or dropping into depressions. Such sidewise movements of the furrow wheel are often very quick and forceful, and, by being imparted to the operating lever, frequently render such lever difficult of control and, indeed, at times constitute a menace to the driver, who, by reason of his proximity to the lever while in his seat, is liable to be struck and injured by such lever.

It is one of the objects of this invention to provide a novel construction and arrangement of parts that will enable the furrow wheel to be securely locked in position relatively to the plow frame so that such wheel will move forward in a straight line within the furrow in the usual manner of such wheels, but which can be very quickly and easily disengaged from such locking engagement and thereby be free to caster, as is desirable when the machine is being turned, as at a corner, and during such disengagement from said locking position not have the controlling lever for said wheel in any way affected by or partake of the oscillatory or lateral-turning movements of said wheel that necessarily result from it then functioning as a caster wheel,—such freedom of the controlling lever at that time from being affected by the movements of the wheel ensuring the driver from liability of being struck and injured by the lever, as in former constructions.

It is another object of the invention to provide means in connection with said controlling lever whereby by a lateral movement of said lever the furrow wheel may be quickly shifted from one operative position to another as may from time to time be necessary accordingly as the surface of the ground being plowed is level or sloping, and after each such adjustment have the furrow wheel securely locked and held in its newly adjusted position.

Another object is to provide a construction and arrangement of parts that, after the driver has released the furrow wheel from its locking engagement relatively to the plow frame in order to permit it to function as a caster wheel during a turning operation of the machine, the wheel can be automatically locked after the machine has turned the corner, in the same operative position that it was in before it was allowed to caster.

We attain these stated objects and improve generally the construction and operation of machines of this type by the construction and arrangement of parts as shown in the drawings and hereinafter particularly described. What we claim as new and desire to secure by Letters Patent is set forth in the claims.

In the accompanying drawings,—

Figs. 1 and 2 are a plan view and a side elevation, respectively, of a plow embodying our improvements, the furrow wheel controlling means being shown in position to lock the furrow wheel in operative position so that it tends to travel parallel with the direction of movement of the machine;

Fig. 3 is an enlarged detail in side elevation of the furrow wheel controlling lever and parts connected therewith and showing the hand latch that is pivotally mounted upon the lever turned into past center locking position to release the furrow wheel from locking position relatively to the plow frame;

Fig. 4 is a view of the same parts as in Fig. 3 but showing the controlling lever raised into position to enable it to rock the vertical standard of the furrow wheel so as to change the operative position of such furrow wheel;

Fig. 5 is a plan view of the parts shown in Fig. 4 but with the upper end of the furrow wheel standard and the rearwardly-projecting sector that is mounted thereon cut away;

Fig. 6 is a detail being a vertical section taken through the sleeve or bracket in which is journaled the furrow wheel standard;

Fig. 7 is a horizontal section taken on the line 7—7 of Fig. 3; and

Fig. 8 is a detail being a plan view of the sector that is secured to the upper end of the furrow wheel standard.

Referring to the several figures of the drawings, in which like parts are indicated by the same reference characters, 10 indicates a plow beam and 11 a plow bottom connected thereto as usual. Ordinary lever mechanism will be provided for raising and lowering the plow frame as usual, but as this invention relates to novel means employed solely in connection with the furrow wheel of the machine, and as the raising and lowering mechanism referred to may be of any usual construction, the description will be confined to said furrow wheel mechanism. Projecting laterally from opposite sides of the plow beam are brackets indicated respectively by 12 and 13. These two brackets are provided with registering holes above and below the plow beam to receive inner end portions of two bails 14 and 15 that are bent to extend, as best shown in Fig. 1, to the rear and then outwardly toward the furrow side of the machine. 16 indicates a bracket in the form of a vertically disposed sleeve, which bracket has two pairs of spaced-apart rearwardly extending ears 17 and through openings in each pair of such ears extend one of the outwardly directed end portions of each of said bail members. Located between each of the pairs of ears is a collar 18, and through these collars the end portions of the bail members also pass, as best shown in Fig. 7, and are locked in place by set screws 19, and it will be evident that said set screws will hold the bracket member 16 securely clamped to the bail members at the desired distance from the plow beam.

20 indicates the furrow wheel, which is supported in the usual inclined position upon the spindle portion of a bent axle, the upper portion of which is in the form of a vertical standard indicated by 21, said standard being journaled in the sleeve-like bracket 16 and extending, as clearly shown in Fig. 6, for some little distance beyond the upper end of said bracket 21. Upon the standard 21 is secured a collar 22 against which the lower end of the bracket 16 bears and is supported. Near the upper end of the standard 21 is rigidly secured a horizontally disposed and rearwardly extending sector 23. In the construction shown it is secured in place by bolts 24 that pass through its ends and through clamping blocks 25 that embrace the standard, but of course any other suitable means for securing said sector to the standard may be employed. In the central edge portion of the sector is a single notch 26, the object of which will be hereinafter explained.

Interposed between the means that secure the sector to the standard 21 and the upper end of the tubular bracket that such standard passes through is a hand lever 27. This lever at its forward end preferably comprises two pieces of metal riveted together as shown, and diverging sufficiently to receive between them a collar 28 that is rotatably mounted upon the standard 21, and, as shown, this collar has an enlargement or a bulge at its forward side through which and through the two parts of the lever passes a pin 29 that serves as a pivot upon which the lever can be vertically rocked, and inasmuch as the collar 28 is, as stated, loose on the standard, it is evident that the lever can be rocked both vertically and laterally. Adjacent to the free end of the lever 27 and pivoted thereto at 30 is a latch 31, and near the inner or forward end of the lever is pivotally attached at 32 a dog 33 which, as here shown, is formed of a short, flat bar that projects both above and below the lever, and the forward edge of the upper portion of which is adapted to enter the notch 26 in the sector 23. The latch and dog are connected together by a link 34 which, as shown, extends in a diagonal direction between the upper part of the dog and the lower part of the latch. A coiled spring 35 is provided that engages the lower part of the dog and is attached at its other end in any suitable manner to the lever 27 at a point in rear of the pivot of the dog, and the effect of such spring is, therefore, to tend to normally keep the dog in engagement with the notch 26 in the sector, but if the latch is turned forward to the limit of its movement, as is shown to be the case in Fig. 3, the point of attachment of the link to the latch will be carried slightly past the pivot 30 of such latch, and by reason of this past-center position the dog will be drawn back and held out of engagement with the sector. As shown, the latch is provided with a laterally-extending pin 36 that is adapted to come in contact with the upper edge of the lever 27 and act as a limit stop to the movement of the latch in either direction, as will be evident from an inspection of Figs. 3 and 4.

It will be apparent that so long as the dog 33 is in engagement with the central notch 26 of the sector 23, the standard 21 of the furrow wheel cannot rotate, provided that the lever 27 is held against any lateral movement, and therefore with the lever so held the furrow wheel will properly function by traveling as desired in the furrow. It is also evident that when the dog is drawn out of engagement with the sector 23 the standard is freed from any restraint against rocking in its sleeve bearing 16, and, therefore, the furrow wheel that it carries may function as a caster wheel, as is desirable when the machine is being turned at the end of a furrow. To hold the lever 27 locked against undesired lateral movement there is provided another sector 37 which, in the construction shown, has its end portions secured to opposite sides of the sleeve bearings 16, and so arranged that it extends rearwardly and upwardly to bring its upper edge adjacent to the lower edge of the lever 27. The upper edge of this second sector 37 is notched to receive the lower edge of the lever, and when such lever is in engagement with said inclined sector it follows, of course, that the lever is prevented from any sidewise movement, and thus, when the dog that the lever carries is in engagement with the upper sector 23, there can be no movement out of operative position of the furrow wheel. As shown, the sector 37 is provided with a central notch in its upper edge and a notch at each side of said central notch and spaced a short distance therefrom. The object of providing a plurality of such notches is to furnish means for locking the furrow wheel standard 21 in different positions so as to position its furrow wheel to adapt it for different ground conditions. If, for example, the plow is running straight ahead on comparatively level ground, the lever 27 would be in engagement with the central one of the notches of the inclined sector 37, which engagement would so hold the furrow wheel standard that the furrow wheel would be properly positioned in the furrow, but in case the machine came upon sloping ground which made it desirable to change the angle of the furrow wheel in order to resist lateral tendency of the plow, the operator by raising the lever so that it turned on its pivot 29 could free it from the central notch in the sector 37, and then by forcing it laterally bring it opposite the desired notch at one side of the central one and cause it to engage therewith,—such raising and lateral swinging of the lever not disturbing of course the engagement of the dog 33 with the upper sector 23, and therefore such lateral swinging of the lever causing a corresponding turning of the standard 21 that carries the furrow wheel to position such furrow wheel in its new operative position. The weight of the lever will normally hold it interlocked with the sector 37.

When the machine has reached a corner where a turn is to be made, the driver can turn the latch 31 sufficiently to cause a withdrawal of the dog from the notch 26 in the sector 23, and thereupon, of course, the furrow wheel will be free to caster because of the fact that its standard 21 is no longer restrained from turning in the sleeve bracket 16. When such standard has turned slightly, the driver can release his hold on the latch, and thereupon, through the pull of the spring 35, the dog will be drawn against the smooth edge of said sector 23 and so remain until after the turning operation has been completed and the furrow wheel is again positioned for direct forward travel. As that occurs, the sector 23 will of course be turned, and as its notch 26 comes opposite the dog the action of the spring 35 will snap such dog again into that notch and thereupon the furrow wheel will be again locked so as to continue to properly function as a furrow wheel. The return to normal locked position of the furrow wheel can thus be accomplished automatically, as will be evident. If, however, for any reason the driver does not wish to retain his hold on the latch long enough to permit the castering of the furrow wheel to cause such a turning of its standard as to carry the notch in the sector 23 out of alinement with the dog, he can throw the latch far enough over so that it assumes the past-center locking position shown in Fig. 3, with the result that the dog will be positively held out of engagement with the sector 23 until such time as the driver may again turn back the latch in order to allow the spring to force the dog toward said sector. It is evident that it is not necessary to disengage the lever 27 from the inclined sector 37 at any of the times that the dog is disengaged from the other sector, and therefore with the lever remaining in engagement with one of the notches in the inclined sector 37 there will be ensured after each castering operation of the furrow wheel a return of such furrow wheel to its function as a furrow wheel with the same angular adjustment or lead that it previously had. It is also evident that, as clearly shown by Fig. 4, the controlling lever may be turned on its pivot 29 to disengage it from one of the notches in the inclined sector 37 without affecting the engagement of the dog 33 with the other sector, and as a result of this, the lateral angle or lead of the furrow wheel may be at any time changed as desired without releasing the locking connection of the lever with the standard of the furrow wheel.

From the foregoing description of the construction and operation of the several parts, it will be seen that by a single lever the furrow wheel can be easily and quickly controlled by the driver on his seat, both as to its adjustment as to the lead which it is desired shall be given to it accordingly as to whether the ground is inclined or comparatively level, and as to it functioning when desired as a caster wheel, and also that, regardless of obstructions or depressions that might otherwise tend to cause a violent sidewise movement of the lever if connected directly with the furrow wheel standard, the lever as here shown and described is held against such movement with consequent greater safety to the driver.

What we claim as our invention and desire to secure by Letters Patent, is—

1. In a plow, the combination of a furrow wheel, a standard therefor, a stationary member in which said standard is journaled, a lever movably mounted upon said standard, and means comprising a movable element carried by the lever for locking the standard against rotative movement.

2. In a plow, the combination of a furrow wheel, a standard therefor, a stationary member in which said standard is journaled, a lever movably mounted upon said standard, and means comprising a spring-actuated manually-controlled element carried by the lever for locking the standard against rotative movement.

3. In a plow, the combination of a furrow wheel, a standard therefor, a stationary member in which said standard is journaled, a lever movably mounted upon said standard and adapted to be moved both vertically and laterally, means carried by the said stationary member for supporting the lever and for preventing it while so supported from being moved laterally, and other means comprising a movable element carried by the lever for locking the standard against rotation during the time said lever is engaged by said supporting means.

4. In a plow, the combination of a furrow wheel, a standard therefor, a member in which said standard is rotatably supported, a lever loosely mounted on said standard and adapted to be moved both vertically and laterally, means for holding said lever normally in locked engagement with said supporting member, and other means carried by said lever for detachably interlocking it with said standard.

5. In a plow, the combination of a furrow wheel, a standard therefor, a bracket in which said standard is journaled, a lever loosely mounted on said standard and adapted to be moved both vertically and laterally, and means for holding said lever in locked engagement with both the standard and the bracket or with either one only of said last-named parts.

6. In a plow, the combination of a furrow wheel, a standard therefor, a bracket in which said standard is journaled, sectors carried by said standard and bracket respectively, a lever loosely mounted on said standard and adapted to be moved both vertically and laterally, said lever lying between said sectors and normally being in interlocking relation with the sector carried by the bracket, and means carried by the lever for holding it either in or out of engagement with the other sector.

7. In a plow, the combination of a furrow wheel, a standard therefor, a sector carried by said standard, a bracket in which said standard is journaled, a sector carried by said bracket, a lever loosely mounted on said standard and normally interlocked with said second-named sector, and means carried by the lever for interlocking it with or releasing it from said first-named sector.

8. In a plow, the combination of a furrow wheel, a standard therefor, a sector carried by said standard, a bracket in which said standard is journaled, a sector carried by said bracket, a lever loosely mounted on said standard and located between the said sectors and normally held in engagement by gravity with the sector carried by the bracket, and means carried by the lever for interlocking it with or releasing it from said other sector.

9. In a plow, the combination of a furrow wheel, a standard therefor, a sector carried by said standard and provided with a notch, a bracket in which said standard is journaled, a sector carried by said bracket and having a plurality of notches, a lever loosely mounted on said standard and movable both vertically and laterally and normally engaging one of the notches in said second-named sector, and manually-controlled means carried by the lever for engaging the notch in the first-named sector.

10. In a plow, the combination of a furrow wheel, a standard therefor, a sector carried by said standard and provided with a notch, a bracket in which said standard is journaled, a notched sector carried by said bracket, a lever loosely mounted on said standard and movable both vertically and laterally and normally in interlocked engagement with said second-named sector, a movable dog mounted on the lever opposite said first-named sector, a spring for holding said dog against the edge of said first-named sector and forcing it into the notch thereof as such notch is brought opposite the dog by a movement of the standard, and manually-operated means for drawing the dog out of operative position.

CARL G. STRANDLUND.
THEOPHILUS BROWN.